(12) United States Patent  (10) Patent No.: US 7,463,863 B1
Vermeer  (45) Date of Patent: Dec. 9, 2008

(54) WIRELESS TERMINAL ADAPTED FOR DETACHABLY CONNECTING WITH A RADIO

(75) Inventor: Fulps Vincentinus Vermeer, Nieuwegein (NL)

(73) Assignee: Agere Systems, Inc., Allentown, PA (US)

( * ) Notice: Subject to any disclaimer, the term of this patent is extended or adjusted under 35 U.S.C. 154(b) by 1092 days.

(21) Appl. No.: 08/909,001

(22) Filed: Aug. 8, 1997

(51) Int. Cl.
    *H04B 17/00* (2006.01)
(52) U.S. Cl. .................. 455/67.7; 455/557; 343/702
(58) Field of Classification Search .............. 455/66, 455/90, 95, 550, 556, 575, 190.1, 188.1, 455/131, 180.1, 188.2, 566.5, 571, 572, 451, 455/11.1, 13.3, 19, 67.7, 82–83, 550.1, 556.1–559, 455/562.1, 566–567, 575.1, 575.7, 90.3, 455/344–349, 127–129, 557, 67.11, 115.4, 455/421, 457; 364/701.05, 701.07, 400; 379/454–455, 425–432, 446, 449; 343/702–703, 343/721; 361/681–689, 737; 359/172, 145, 359/155, 163
See application file for complete search history.

(56) References Cited

U.S. PATENT DOCUMENTS

| | | | | | |
|---|---|---|---|---|---|
| 2,473,981 | A | * | 6/1949 | Wood | 240/8.1 |
| 3,939,421 | A | * | 2/1976 | Barringer et al. | 325/133 |
| 4,122,304 | A | * | 10/1978 | Mallien, II | 179/2 |
| 4,186,342 | A | * | 1/1980 | Kyle | 325/17 |
| 4,792,986 | A | * | 12/1988 | Garner et al. | 455/89 |
| 4,890,102 | A | * | 12/1989 | Oliver | 714/712 |
| 4,935,746 | A | * | 6/1990 | Wells | 343/703 |
| 5,014,302 | A | * | 5/1991 | Kappeler et al. | 379/165 |
| 5,081,627 | A | * | 1/1992 | Yu | 714/46 |
| 5,307,053 | A | * | 4/1994 | Wills et al. | 340/573.1 |
| 5,343,319 | A | * | 8/1994 | Moore | 398/115 |
| 5,448,765 | A | * | 9/1995 | Kovanen et al. | 455/30 |
| 5,479,479 | A | * | 12/1995 | Braitberg et al. | 379/58 |
| 5,495,357 | A | * | 2/1996 | Osterhout | 398/107 |
| 5,555,550 | A | * | 9/1996 | Kaschke | 379/59 |
| 5,566,226 | A | * | 10/1996 | Mizoguchi et al. | 455/558 |
| 5,590,346 | A | * | 12/1996 | West et al. | 395/800 |
| 5,628,055 | A | * | 5/1997 | Stein | 455/90 |
| 5,649,311 | A | * | 7/1997 | Somei | 455/188.1 |
| 5,708,833 | A | * | 1/1998 | Kinney et al. | 395/800 |
| 5,726,893 | A | * | 3/1998 | Schuchman et al. | 364/449.7 |
| 5,734,487 | A | * | 3/1998 | Rossi | 398/115 |
| 5,805,998 | A | * | 9/1998 | Kodama | 455/462 |
| 5,903,850 | A | * | 5/1999 | Hutunen et al. | 455/557 |
| 5,913,174 | A | * | 6/1999 | Casarez et al. | 455/557 |
| 5,917,453 | A | * | 6/1999 | Uchino et al. | 343/721 |
| 5,966,638 | A | * | 10/1999 | Mita et al. | 455/3.06 |

(Continued)

FOREIGN PATENT DOCUMENTS

DE 0369110 * 5/1990

*Primary Examiner*—Pablo N Tran

(57) ABSTRACT

A wireless terminal is disclosed that interfaces a radio on a radio card to a wireless terminal with a single two-lead cable that is capable of carrying both: (1) RF signals from the radio card to an antenna on a wireless terminal, and (2) radio status signaling from the radio card to a display on the wireless terminal. The wireless terminal comprises (1) an antenna, (2) a first visual indicator that indicates to a user of the wireless terminal when a radio is transmitting, and (3) a signal lead for carrying an RF signal from the radio to the antenna and for carrying a first baseband signal from the radio to the first visual indicator.

11 Claims, 2 Drawing Sheets

U.S. PATENT DOCUMENTS

| | | | |
|---|---|---|---|
| 5,999,294 A * | 12/1999 | Petsko | 398/115 |
| 6,005,700 A * | 12/1999 | Pressler et al. | 398/117 |
| 6,262,686 B1 * | 7/2001 | Delarminat et al. | 343/721 |
| 6,295,031 B1 * | 9/2001 | Wallace et al. | 343/702 |
| 6,762,930 B2 * | 7/2004 | Minne' | 361/683 |

* cited by examiner

WIRELESS TERMINAL ADAPTED FOR DETACHABLY CONNECTING WITH A RADIO

FIELD OF THE INVENTION

The present invention relates to a wireless terminal in general, and, more particularly, to a wireless terminal that is adapted for detachably connecting with a radio, such as can be found in a radio PC card.

BACKGROUND OF THE INVENTION

In the last few years it has become increasingly common for a hand-held wireless terminal (e.g., a supermarket scanner, a warehouse data-entry device, etc.) to be equipped with a wireless telecommunications capability to enable the wireless terminal to transmit information to a host system, or to receive information from the host system, or both. For example, a worker in a warehouse can carry a wireless terminal to assist a host system in monitoring inventory. The host system can transmit by radio to the wireless terminal a request to the worker to check how many units of a particular item are in the warehouse. After the worker has counted the number of units the worker can enter the number into the wireless terminal, which relays the number back to the host system by radio.

Although some wireless terminals (e.g., cellular telephones, cordless telephones, etc.) are manufactured with a permanent, integrated radio, other wireless terminals (e.g., hand-held data-entry devices, notebook computers, etc.) are not. One advantage of manufacturing a wireless terminal without a permanent radio is that it enables the end-user to select a radio for mating with the wireless terminal that is appropriate for the environment in which the wireless terminal will operate.

The wireless terminals that are manufactured without an integrated radio are, however, usually manufactured with the capability to connect with a radio. Typically, the connection is made through an industry-standard interface that prescribes both the mechanical and electrical interface. Currently, the PCMCIA "PC Card" interface is the standard to which almost all wireless terminals are designed.

The PCMCIA interface prescribes a slot in the wireless terminal for receiving a credit-card shaped radio card and a 68-pin electrical connector on both the radio card and in the slot so that the radio card and the wireless terminal can share power, ground and signaling. The PCMCIA interface also specifies the voltages, timing, and signaling protocols on each lead of the 68-pin electrical connector.

Typically, a PCMCIA radio card has a built-in antenna for transmitting and receiving signals, but such a built-in antenna rarely has as good radio propagation characteristics as does an external antenna that is mounted on the outside of the wireless terminal. Therefore, when a user desires to have a PCMCIA radio card employ an external antenna that is part of the wireless terminal some provision must be made to electrically connect the radio card to the antenna. Unfortunately, the PCMCIA interface specification does not provide for the transmission of RF signals over the 68-pin interface, and, therefore, a separate cable must be provided to carry the RF signals between the antenna and a non-standard connector that must be added to the radio card.

It is also advantageous for a wireless terminal to display to the user the status of the radio. For example, a wireless terminal can have one LED that is illuminated when the radio is transmitting and another LED that is illuminated when the radio is receiving. When neither LED is illuminated, it means that the radio is in standby mode. When the radio is manufactured as a integral part of the wireless terminal, signals from the radio can control the illumination of the radio status LEDs through as many wires as are necessary.

In contrast, when the radio is contained in a PCMCIA radio card the radio has no inherent means for controlling the radio status LEDs because the PCMCIA interface specification does not provide for the transmission of radio status signaling. Therefore, a separate cable must be provided from a non-standard connector that must be added to the radio card to the LEDs so that the radio can control the illumination of the radio status LEDs.

It is clearly advantageous for a radio on a radio card to be able to use an external antenna that is mounted on the wireless terminal, but the necessity of providing a separate cable to carry the RF signals and a separate cable to carry the radio status LED control signals adds to the cost of both the wireless terminal and the radio card. Furthermore, each of the two cables must be connected to the radio card each time the radio card is inserted, which given that the components are small and the space constraints tight, can hamper the task of attaching the cables to the radio card. Therefore, a need exists for a better mechanism for connecting a radio on a radio card to an externally mounted antenna and a radio status display.

SUMMARY OF THE INVENTION

Some embodiments of the present invention are capable of interfacing a radio on a radio card to a wireless terminal without some of the costs and problems associated with techniques in the prior art. For example, the illustrative embodiment of the present invention uses just one two-lead cable that is capable of carrying both (1) RF signals from a PCMCIA radio card to an antenna on a wireless terminal, and (2) radio status signaling from the radio card to a display on the wireless terminal. The fact that only a single, two-lead cable is used will typically reduce the cost of both the wireless terminal and the radio card, and will mitigate the difficulty of attaching the cable to the radio card.

This result can be obtained in the illustrative embodiment of the present invention in which a wireless terminal comprises (1) an antenna, (2) a first visual indicator that indicates to a user of the wireless terminal when a radio is transmitting, and (3) a signal lead for carrying an RF signal from the radio to the antenna and for carrying a first baseband signal from the radio to the first visual indicator.

DETAILED DESCRIPTION

Figure 1:
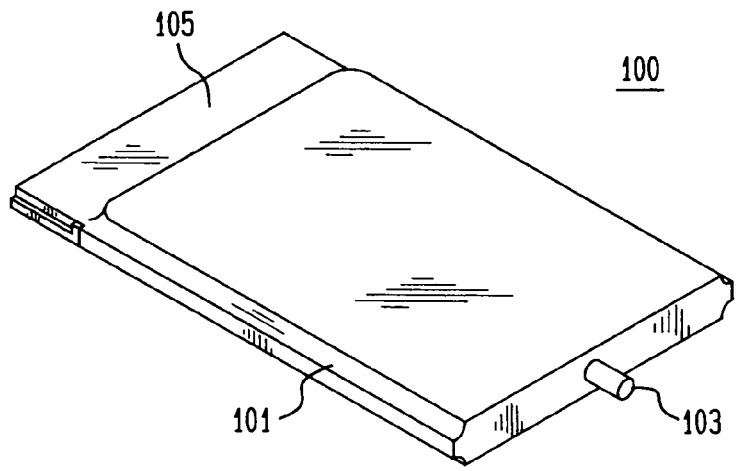
FIG. 1 is an isometric drawing of PCMCIA radio card in accordance with the illustrative embodiment of the present invention.

FIG. 1 depicts an isometric drawing of radio card 100 in accordance with the illustrative embodiment. Radio card 100 advantageously has a standard PCMCIA form factor and advantageously comprises an integral radio (not shown), standard 68-pin connector 105 and detachable connector 103.

Figure 2:
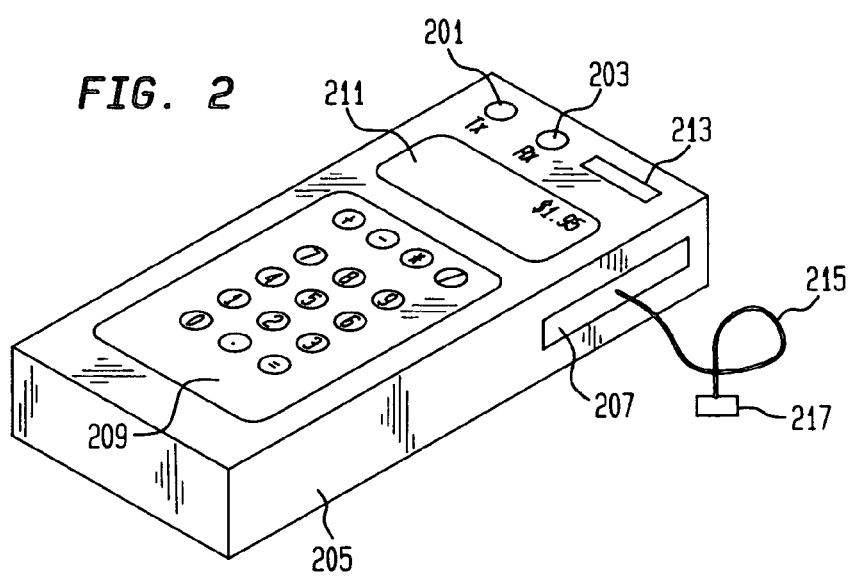
FIG. 2 is an isometric drawing of a wireless terminal capable of detachably connecting with the PCMCIA radio card shown in FIG. 1.

FIG. 2 depicts an isometric drawing of wireless terminal 200 in accordance with the illustrative embodiment. Wireless terminal 200 advantageously comprises housing 205, transmit indicator 201, receive indicator 203, PCMCIA slot 207, a standard 68-pin connector within wireless terminal 200 (not shown), keypad 209, display 211, antenna 213, cable 215 and detachable connector 217.

Radio card 100 is advantageously capable of being seated in PCMCIA slot 207 in well-known fashion. Connector 105 on radio card 100 is advantageously capable of mating with the 68-pin connector (not shown) within PCMCIA slot 207. Radio card 100 advantageously transmits and receives most of its signaling with wireless terminal 200 through connector 105 and also gets its power from wireless terminal 200 through connector 105. The voltages, timing and signaling protocols on each pin of connector 105 is standardized and well-known to those skilled in the art.

Radio card 100 is advantageously capable of transmitting and/or receiving RF signals. The standard PCMCIA 68-pin interface standard does not provide for the transmission of RF signals, nor of radio status signals, such as those needed to control transmit indicator 201 and receive indicator 203. Therefore, an additional connector, detachable connector 103, is advantageously provided on radio card 100 to enable it to transmit and/or receive RF signals via antenna 213 and cable 215 when detachable connector 217 is connected to detachable connector 103. U.S. patent application Ser. No. 08/781,970, entitled "Antenna Apparatus in Wireless Terminals" is incorporated by reference and teaches how to make and use antenna 213 when antenna 213 is a slot antenna. It will be clear to those skilled in the art how to make and use antenna 213 for other types of antennas.

Advantageously, cable 215 is a coaxial cable comprising a signal lead and a shielding lead. Advantageously, detachable connectors 103 and 217 are shielded and provide a pair of electrical connections. Detachable connectors 103 and 217 can be, for example, bayonet connectors or any other similar type of connector. It will be clear to those skilled in the art how to make and use cable 215 and detachable connectors 103 and 217.

Because connectors and cables are expensive and difficult to handle, radio card 100 advantageously provides for the transmission of the radio status signals in addition to RF signals over cable 215 and detachable connectors 103 and 217. To accomplish this, radio card 100 advantageously frequency division multiplexes one or more baseband signals with the RF signals transmitted and received over cable 215, which baseband signals are used by wireless terminal 200 to control transmit indicator 201 and receive indicator 203. Advantageously, the baseband signals are direct current ("DC") signals. Transmit indicator 201 and receive indicator 203 can be, for example, light emitting diodes or any other visual display or tactile device that is capable of indicating to a user when the radio is transmitting, receiving or in standby mode.

For example, one signal can indicate that the radio is transmitting and another signal can indicate that the radio is receiving. Table I shows three illustrative signals that radio card 100 can provide to wireless terminal 200 and their associated meaning.

TABLE 1

| Signal | Meaning |
|---|---|
| 0 volts | Standby |
| 3 volts | Radio is receiving |
| 5 volts | Radio is transmitting |

Figure 3:
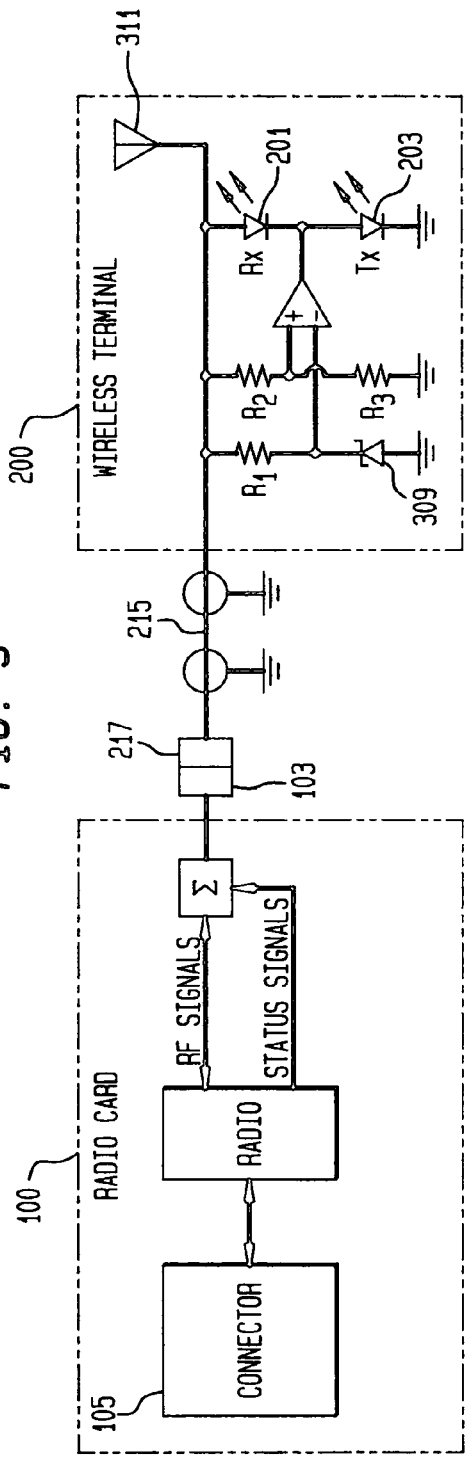
FIG. 3 is a schematic diagram of a circuit that can be used in the wireless terminal of FIG. 2.

FIG. 3 depicts a schematic diagram of the electrical connectivity of the radio in radio card 100 and of the illustrative circuitry in wireless terminal 200 to generate, multiplex, transmit and interpret the radio status signals.

Figure 5:
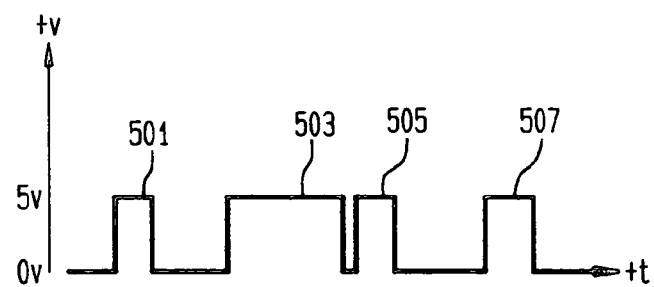
FIG. 5 is a graph of a typical voltage versus time curve used in setting and resetting the circuit of FIG. 4.
Figure 4:
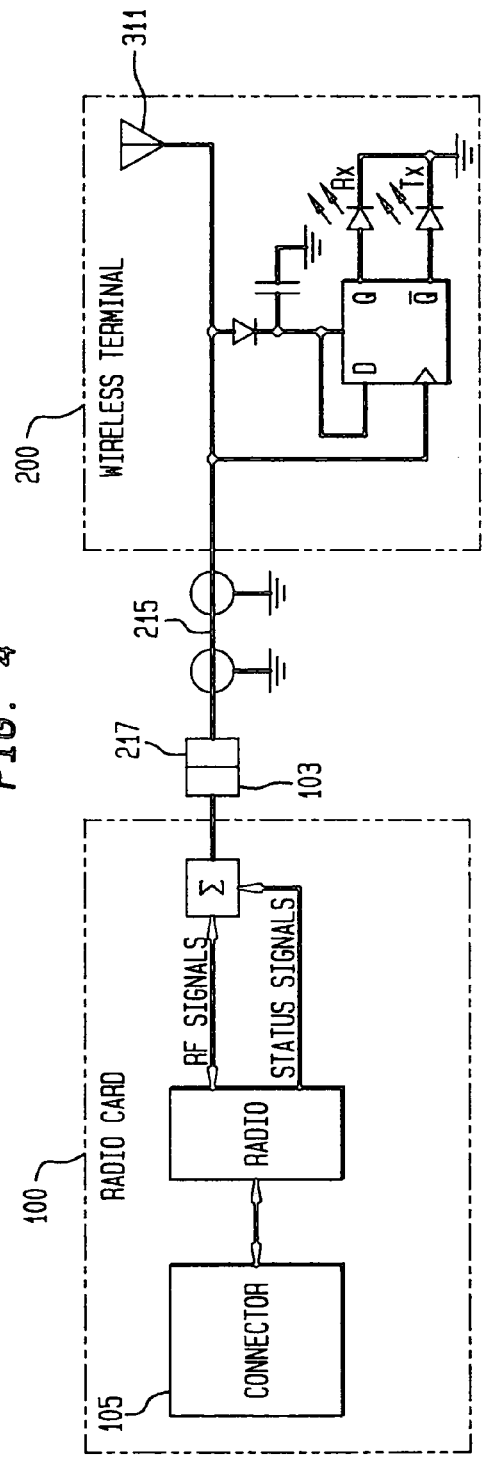
FIG. 4 is a schematic diagram of a second circuit that can be used in the wireless terminal of FIG. 2.

Alternatively, radio card 100 can transmit the radio status signals as a series of DC pulses, as shown in FIG. 5. When the DC voltage is 0 volts, the radio is neither receiving nor transmitting. One pulse turns on transmit indicator 201 and turns off receive indicator 203, and another pulse turns off transmit indicator 201 and turns on receive indicator 203. Transmit indicator 201 is, for example, on during pulses 501 and 505, and receive indicator is on during pulses 503 and 507. It will be clear to those skilled in the art that the duration of a pulse can be made so short that the user won't see the indicator blink or, alternatively, lapse. It will be also clear to those skilled in the art how to make pulses that do not have frequency components of such frequency that they interfere with the RF signals on cable 215. FIG. 4 depicts a schematic diagram of the electrical connectivity of the radio in radio card 100 and of illustrative circuitry in wireless terminal 200 to generate, multiplex, transmit and interpret pulse radio status signals.

It is to be understood that the above-described embodiments are merely illustrative of the invention and that many variations may be devised by those skilled in the art without departing from the scope of the invention. It is therefore intended that such variations be included within the scope of the following claims.

What is claimed is:

1. A wireless terminal comprising:
   an antenna;
   a first visual indicator that provides a visual indication to a user of said wireless terminal when a radio is transmitting and stops providing said visual indication when said radio is receiving; and
   a signal lead for carrying an RF signal from said radio to said antenna and from said antenna to said radio and for carrying a first baseband signal from said radio to said first visual indicator for activating said first visual indicator,
   wherein said first baseband signal is multiplexed with said RF signal and is a series of direct current pulses indicating radio status, said first baseband signal multiplexed with said RF signal applied to said first visual indicator.

2. The wireless terminal of claim 1 further comprising said radio.

3. The wireless terminal of claim 2 wherein said radio is integral to a PC radio card.

4. The wireless terminal of claim 1 wherein said signal lead is connected to said radio by a detachable connector.

5. The wireless terminal of claim 1 further comprising a second visual indicator that indicates when said radio is receiving and wherein said signal lead also carries a second baseband signal from said radio to said second visual indicator wherein said second baseband signal is multiplexed with said RF signal and said second baseband signal multiplexed with said RF signal applied to said second visual indicator.

6. A wireless terminal comprising:
an antenna;
a first visual indicator that provides a visual indication to a user of said wireless terminal when a radio is receiving and stops providing said visual indication when said radio is transmitting; and
a signal lead for carrying an RF signal from said radio to said antenna and from said antenna to said radio and for carrying a first baseband signal from said radio to said first visual indicator for activating said first visual indicator wherein said first baseband is multiplexed with said RF signal and is a series of direct pulses indicating radio status, said first baseband signal multiplexed with said RF signal applied to said first visual indicator.

7. The wireless terminal of claim 6 further comprising said radio.

8. The wireless terminal of claim 7 wherein said radio is integral to a PC radio card.

9. The wireless terminal of claim 6 wherein said signal lead is connected to said radio by a detachable connector.

10. The wireless terminal of claim 6 further comprising a second visual indicator that indicates when said radio is transmitting and wherein said signal lead also carries a second baseband signal from said radio to said second visual indicator wherein said second baseband signal is multiplexed with said RF signal and said second baseband signal multiplexed with said RF signal applied to said second visual indicator.

11. A wireless terminal comprising:
a radio;
an antenna;
a first visual indicator that indicates to a user of said wireless terminal when said radio is operating; and
a cable that is detachably connected to said radio and that is also connected to said antenna for carrying an RF signal and for carrying a first baseband signal from said radio to said first visual indicator wherein said first baseband signal is a series of direct current pulses indicating radio status;
wherein said first visual indicator indicates when said radio is receiving and further comprising a second visual indicator that indicates when said radio is transmitting and wherein said cable also carries a second baseband signal from said radio to said second visual indicator, wherein each of said first and second baseband signals is multiplexed with said RF signal, each of said first and second baseband signals multiplexed with said RF signal and applied to said first and second visual indicators respectively.

* * * * *